United States Patent [19]
Hoffmann

[11] Patent Number: 4,721,445
[45] Date of Patent: Jan. 26, 1988

[54] OUTER ENVELOPE TROCHOIDAL ROTARY DEVICE HAVING A ROTOR ASSEMBLY HAVING PERIPHERAL RELIEFS

[75] Inventor: Ralph Hoffmann, Eden Prairie, Minn.

[73] Assignee: Compression Technologies, Inc., Eden Prairie, Minn.

[21] Appl. No.: 948,126

[22] Filed: Dec. 31, 1986

[51] Int. Cl.⁴ .......................... F01C 1/02; F01C 21/08
[52] U.S. Cl. .................................. 418/61 B; 418/151; 74/573 R
[58] Field of Search ................. 418/61 A, 61 B, 61 R, 418/270, 151; 74/573 R

[56] References Cited

U.S. PATENT DOCUMENTS

| | | | |
|---|---|---|---|
| 3,151,488 | 10/1964 | Tracy et al. | 74/573 |
| 3,377,846 | 4/1968 | de Castelet | 418/151 |
| 4,086,038 | 4/1978 | Lambrecht | 418/151 |

FOREIGN PATENT DOCUMENTS 2373308 12/1976 France .

Primary Examiner—John J. Vrablik
Assistant Examiner—Leonard P. Walnoha
Attorney, Agent, or Firm—Hill, Van Santen, Steadman & Simpson

[57] ABSTRACT

A rotor assembly for an outer envelope trochoidal device. The rotor assembly has an outer peripheral surface that defines a trochoidal curve and includes at least one tapped hole on one lobe. The tapped hole includes an adjustable balancing member for balancing the rotor assembly.

15 Claims, 2 Drawing Figures

OUTER ENVELOPE TROCHOIDAL ROTARY DEVICE HAVING A ROTOR ASSEMBLY HAVING PERIPHERAL RELIEFS

BACKGROUND OF THE INVENTION

This invention relates generally to rotary devices. More specifically, this invention relates to outer envelope trochoidal rotary devices.

Trochoidal rotary devices are constructed so that a rotor assembly planetarily rotates in a housing defining a cavity. Trochoidal rotary devices can be divided into two groups: inner envelope trochoidal devices; and outer envelope trochoidal devices. In an inner envelope trochoidal device, the rotor assembly includes apex seals that cooperate with the inner wall surface of the housing to define a plurality of discrete chambers. In an outer envelope trochoidal device the apex seals are mounted in the inner wall of the housing between individual working chambers. The peripheral surface of the rotor assembly cooperates with the apex seals to define a plurality of discrete chambers. Accordingly, the rotary assembly of an outer envelope trochoidal device functions, in part, to seal off the working chambers of the device. The peripheral surface of the rotor assembly and inner wall of the housing function as working chambers for expansion engines, compressors, expanders, meters, etc.

In an outer envelope trochoidal device, because the peripheral surface of the rotor assembly cooperates with the apex seals of the housing to provide a working chamber, it is necessary for the peripheral surface of the rotor assembly to have a construction that will create a seal between the rotor assembly surface and the apex seal. If a seal is not created between the apex seal and peripheral surface of the rotor assembly the efficiency of the engine or compressor will suffer. Indeed, U.S. Pat. No. 3,377,846 states that:

For greater simplification, the balancing of individual assemblies can be effected by using a standard mass and by equalizing the weights of all rotors in the course of manufacture. This requires that the rotors have a mass that can be reduced as necessary, which is often impossible because it is imperative not to drill holes in the peripheral surface or the sides in order not to break the continuity of these surfaces (against which the sealing elements rub). And even if the shape of the rotor should permit the provisions of easily accessible masses without the need to modify said surface in any way, the machining operation necessary on such masses is nonetheless very costly. (Column 1, lines 40–48).

As indicated above, in order to ensure that the rotor assembly planetates correctly in the rotor housing, the rotor assembly must be balanced. Typically, rotor assemblies are balanced by counterweights that are located on the shaft that planetates the rotor assembly. Although it is possible to balance the rotor assembly with these counterweights, it is usually difficult to make the fine balancing adjustments that may be needed. Moreover, due to the positioning of the counterweights on the shaft, it is difficult to access the counterweights if balancing adjustments must be made. Furthermore, as is also indicated by the quote from U.S. Pat. No. 3,377,846, in outer envelope trochoidal device the balancing of the rotor is hindered by the belief that the continuity of the peripheral surface must not be disturbed.

Accordingly, there is a need for an improved means for balancing rotor assemblies in outer envelope trochoidal devices.

SUMMARY OF THE INVENTION

The present invention provides a rotor assembly for use in an outer envelope trochoidal rotary device, the rotor assembly having an outer peripheral surface that defines a trochoidal curve. The rotor assembly includes at least one tapped hole located in a lobe of the rotor assembly. The tapped hole includes a balancing member located within the tapped hole for balancing the rotor assembly. The tapped hole is located at a point forward of the centerline of the lobe in the direction of the rotor rotation. Preferably, the balancing member includes at least one adjustable set screw that is disposed in a threaded aperture defined by the tapped hole.

DETAILED DESCRIPTION OF THE PRESENTLY PREFERRED EMBODIMENTS

Figure 1:
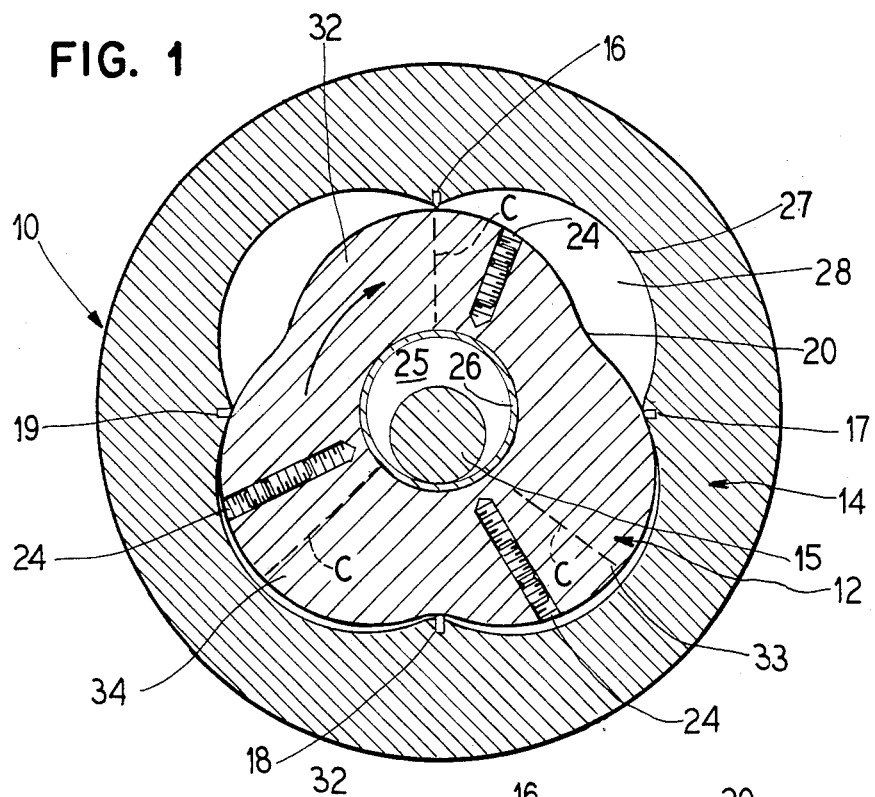
FIG. 1 illustrates a schematic cross-sectional view of a rotor assembly and rotor housing of this invention.

Referring to FIG. 1, a cross-sectional view of an outer envelope trochoidal rotary device 10 of the present invention is illustrated. The trochoidal rotary device 10 includes a rotor 12, a housing 14, and a rotary shaft 15. The rotor 12 moves in a planetating fashion about the shaft 15 within the housing 14 over an eccentric lobe 25 connected to the shaft. The rotor 12 is rotatably mounted over the eccentric via an annular sleeve bearing 26. The trochoidal rotary device 10 uses the space formed between the peripheral wall surface 27 of the housing 14 and the peripheral surface 20 of the rotor 12 to define fluid working chambers 28 for engines, compressors, expanders, meters, etc.

As illustrated, the trochoidal rotary device 10 is an outer envelope trochoidal rotary device having apex seals 16, 17 18 and 19 located in slots in the peripheral wall surface 27 of the housing 14. The radially extending apex seals 16, 17, 18 and 19 function to provide a means for sealing the working chambers 28 across the peripheral wall 27 of the housing 14. Accordingly, the rotor 12 and the apex seals 16, 17, 18 and 19 cooperate to define working chambers 28 in the rotary device 10.

The peripheral surface 20 of the rotor assembly 12 defines a trochoidal curve. As used herein, the term trochoidal curves includes modified trochoidal curves. To this end, the rotor assembly 12 includes a plurality of lobes 32, 33 and 34. Correspondingly, the peripheral wall 27 of the housing 14 defines the outer envelope profile of the trochoidal curve. Although FIG. 1 illustrates a rotary device 10 including a rotor 12 having three convex-extending lobes 32, 33 and 34 mounted for relative movement in a housing 14 having four concave-shaped peripheral lobe surfaces, the rotary device can have other profiles.

As the rotor 12 planetates inside the peripheral wall 27 of the housing 14, each lobe 32, 33, and 34 cooperates with two of the apex seals 16, 17, 18 and 19 to define a working chamber 28. The rotation of the rotor 12 relative to the housing 14 is utilized to vary the volume of the working chambers 28. This variation in volume is utilized to perform work or produce a motive power. Accordingly, it is critical that a seal is effected between the apex seals 16, 17, 18 and 19 and the peripheral surface 20 of the rotor 12. Failure to establish a sufficiently tight seal will result in a corresponding loss of efficiency.

It will also be appreciated that because of the shape of the rotor assembly 12 and peripheral wall 27 of the housing 14, as well as the cooperation needed between the rotor assembly 12 and the apex seals 16, 17, 18 and 19, it is necessary for the rotor assembly to be properly balanced. The eccentric motion exaggerates the difficulties in balancing the rotor assembly 12 in the housing 14.

Figure 2:
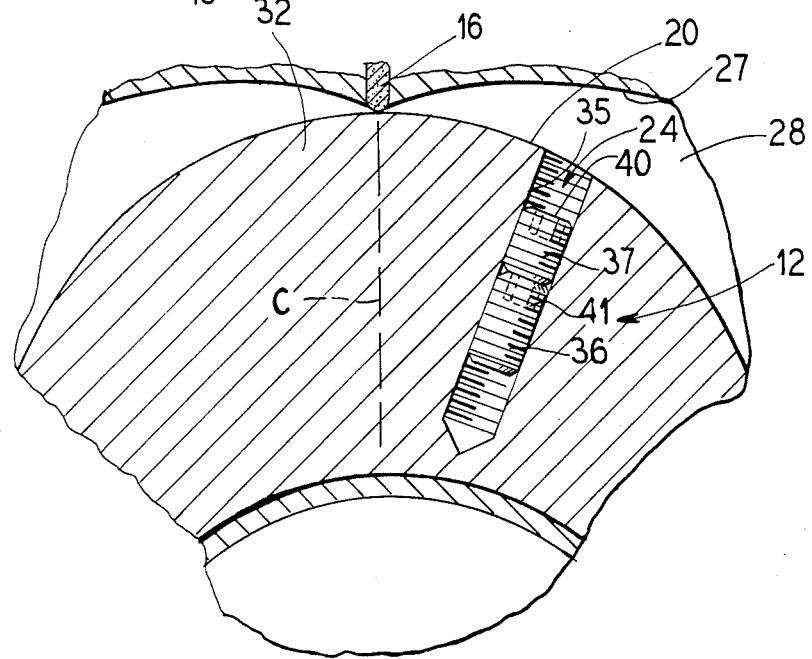
FIG. 2 illustrates a magnified view of a portion of the schematic cross-sectional view of FIG. 1.

Referring to FIG. 2, a magnified view of a portion of the rotor assembly 12 and housing 14 of FIG. 1 is illustrated. As illustrated, the rotor 12 includes a tapped hole 24 in the peripheral surface 20 of the lobe 32. The tapped hole 24 extends from the outer peripheral surface 20 of the rotor assembly 12 radially towards the rotary shaft 15. The tapped hole 24 defines a threaded aperture 35.

Disposed within the tapped hole 24, and specifically within the threaded aperture 35, is at least one adjustable set screw. As illustrated, preferably two adjustable set screws 36 and 37 are disposed in each hole 24. Of course, if desired, more than two set screws can be disposed within the tapped hole 24. The adjustable set screws 36 and 37 cooperate with the threaded aperture 35 so that they are adjustable therein. This provides a means for balancing the rotor 12. To this end, the adjustable set screws 36 and 37 are urged in the tapped hole 24 either towards the rotary shaft 15 or away from the rotary shaft 15 by rotating the set screws 36 and 37 via slots 40 and 41, respectively, in the set screws. Accordingly, a means for fine balancing the rotor assembly 12 is provided.

By utilizing two set screws 36 and 37 in each tapped hole 24, a locking arrangement for the set screws 36 and 37 is provided. To this end, the first set screw 37 cooperates with the second set screw 36 to lock the set screws in place.

The set screws 36 and 37 provide an easy means for balancing the rotor 12. Moreover, in contrast to typical rotor counter balances that are located on the shaft of the rotor assembly, the set screws 36 and 37 are externally accessible and do not require that the rotary shaft 15 or rotary assembly 12 be removed in order to balance the rotor.

The tapped holes 24 are located forward of a centerline C on the lobe 32, 33, and 34 in the direction of rotation of the rotor 12. Therefore, if the rotor 12 rotates in a clockwise manner the tapped holes 24 will be located on the right side of the centerline C of the lobes 32, 33, and 34 and vice versa.

The positioning of the tapped holes 22 forward of the centerline C on the lobes 32, 33, and 34 ensures that the tapped holes 24 pass the apex seals 16, 17, 18 and 19 at a point very early on in compression. Accordingly, as the rotor 12 planetates within the housing 14, the tapped holes 24 will always pass an apex seal 16, 17, 18 and 19 before a center portion of the lobes 32, 33, and 34, that portion of the lobe located adjacent the centerline C, contacts the apex seal. Therefore, any loss of seal integrity is minimal. It has been found that the tapped holes 24 should preferably be located on the arc of the lobe within approximately 15° of the centerline C, although, depending on compression ratio the preferred location may change.

The tapped holes 24 are preferably drilled in the peripheral surface 20 of the rotor 14. Although the set screws 36 and 37 are preferably disposed within the threaded aperture 35 of the tapped holes 24 other balancing means can be utilized and located therein. As illustrated in FIG. 1, the tapped holes 24 and set screws 36 and 37 can be located in every lobe 32, 33, and 34. Of course, the tapped holes 24 and set screws 36 and 37 can be located in only select lobes.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A rotor assembly for use in an outer envelope trochoidal rotary device, the rotor assembly rotating within a cavity defined by a housing, and having an outer peripheral surface defining a trochoidal curve, including at least one tapped hole located in a peripheral surface of a lobe of the rotor assembly, and a balancing member located within the tapped hole for balancing the rotor assembly, the tapped hole being located at a point forward of a centerline of the lobe in the direction of the rotor assembly rotation.

2. The rotor assembly of claim 1 wherein the balancing member includes at least one set screw.

3. The rotor assembly of claim 1 wherein the tapped hole defines a threaded aperture.

4. The rotor assembly of claim 1 wherein the tapped hole extends radially toward a rotary shaft on which the rotor assembly is situated and the set screw can be adjusted radially in the tapped hole to balance the rotor assembly.

5. The rotor assembly of claim 1 wherein the tapped hole is located on an arc of the rotor lobe within 15° of the centerline.

6. A rotor assembly for use in an outer envelope rotary device, the rotor assembly having an outer peripheral surface defining a trochoidal curve, the rotor assembly having a plurality of lobes, the rotor assembly being designed to rotate in a direction in the rotary device, the rotary assembly having at least one tapped hole in the outer peripheral surface of one lobe, the tapped hole being located at a position forward of a centerline in the lobe in the direction of rotation, the rotor assembly further including a balancing member disposed within the tapped hole.

7. The rotor assembly of claim 6 wherein the balancing member includes at least one adjustable set screw.

8. The rotor assembly of claim 7 wherein the tapped hole defines a threaded aperture.

9. The rotor assembly of claim 6 wherein each lobe includes tapped holes and balancing members disposed within the tapped holes.

10. The rotor assembly of claim 6 wherein the tapped hole is located on an arc of the lobe within 15° of the centerline.

11. An outer envelope trochoidal rotary device including a housing defining a cavity and having an inner wall, a rotor assembly for rotating within the housing cavity, the rotor assembly having an outer peripheral surface defining a trochoidal curve and including a plurality of lobes, the lobes cooperating with apex seals located on the inner wall of the housing to define chambers, at least one lobe including a tapped hole having means for adjustably balancing the rotor assembly, the tapped hole being located at a position in the lobe so that the tapped hole passes a first apex seal before a center portion of the lobe contacts the first apex seal.

12. The outer envelope trochoidal device of claim 11 wherein the adjustable balancing means includes at least one set screw.

13. The outer envelope trochoidal device of claim 11 wherein each lobe includes a tapped hole having adjustable balancing means.

14. The outer envelope trochoidal device of claim 12 wherein the tapped hole defines a threaded aperture.

15. The outer envelope trochoidal device of claim 11 wherein the tapped hole is located on an arc of the lobe within approximately 15° of the centerline.

* * * * *